United States Patent [19]

Lamy

[11] Patent Number: 5,253,044
[45] Date of Patent: Oct. 12, 1993

[54] TELEVISION APPARATUS WITH AUTOMATIC SELECTION AND PROCESSING OF VIDEO INPUT SIGNALS OF COMPOSITE AND NON-COMPOSITE FORM

[75] Inventor: Christophe Lamy, VS-Villingen, Fed. Rep. of Germany

[73] Assignee: Deutsche Thomson-Brandt GmbH, Villingen-Schwenningen, Fed. Rep. of Germany

[21] Appl. No.: 812,590

[22] Filed: Dec. 20, 1991

Related U.S. Application Data

[63] Continuation of PCT/EP90/00942, June 15, 1990.

[30] Foreign Application Priority Data

Jun. 23, 1989 [DE] Fed. Rep. of Germany ....... 3920590

[51] Int. Cl.$^5$ ............................................. H04N 9/64
[52] U.S. Cl. ................... 358/21 R; 358/188; 358/181
[58] Field of Search ................ 358/10, 181, 21 R, 26, 358/23, 188, 11

[56] References Cited

U.S. PATENT DOCUMENTS

| | | | |
|---|---|---|---|
| 4,139,865 | 2/1979 | Iida et al. | 358/188 |
| 4,660,073 | 4/1987 | Baumeister | 358/21 |
| 4,776,038 | 10/1988 | Testin et al. | 455/182 |
| 4,802,000 | 1/1989 | Willis | 358/181 |
| 4,841,367 | 6/1989 | Ichikawa et al. | 358/181 |
| 4,864,421 | 9/1989 | Morioka et al. | 358/310 |
| 5,134,483 | 7/1992 | Imbert et al. | 358/181 |

FOREIGN PATENT DOCUMENTS

| | | |
|---|---|---|
| 0309891 | 4/1989 | European Pat. Off. . |
| 0474568 | 3/1992 | European Pat. Off. . |
| 57-38091 | 3/1982 | Japan . |
| 0272390 | 10/1989 | Japan . |
| 0279691 | 11/1989 | Japan . |

OTHER PUBLICATIONS

IEEE 1988 Intl. Conf. on Consumer Electronics T. Kurita et al. "A Practical IDTV System Improving Picture Quality For Non-Standard TV Signals" pp. 68 and 69.
8087 IEEE Transactions on Consumer Electronics "High Performance VTR based on SVHS Format" Nagaoka et al. pp. 560-564; Aug. 1988.

*Primary Examiner*—James J. Groody
*Assistant Examiner*—Jeffrey S. Murrell
*Attorney, Agent, or Firm*—Joseph S. Tripoli; Peter M. Emanuel; Richard G. Coalter

[57] ABSTRACT

A television system comprises a first input terminal (20) for providing a composite video (CSCC) signal or a separated luminance (SCC) signal, and a second input terminal (15) for providing a separated chrominance (C) signal. A change-over switch (11) has a first input (a) coupled to the first input terminal (20) through a path including a color sub-carrier filter (9), a second input (b) coupled to the second input terminal (15) through a path not including the color sub-carrier filter (9), and an output (c) coupled to the input (d) of a color decoder (8). The change-over switch couples the input (d) of the color decoder (8) to the first input terminal (20) in a first position (a), and couples the input (d) of the color decoder (8) to the second input terminal (15) in a second position (b). A sub-carrier detector (CK) is coupled to the output (c) of the change-over switch (11) for detecting the presence or absence of a color sub-carrier. A control unit initially causes the change-over switch (11) to be in the first position (a) and thereafter causes said change-over switch (11) to remain in the first position (a) if a color sub-carrier is present at the output (c) of the change-over switch (11), but causes the change-over switch (11) to be in the second position (b) if a color sub-carrier is not present. Once the change-over switch (11) is in the second position (b), the control unit (1) causes said change-over switch (11) to be switched back to said first position (a) from said second position (b) if a color sub-carrier is still not present.

6 Claims, 1 Drawing Sheet

TELEVISION APPARATUS WITH AUTOMATIC SELECTION AND PROCESSING OF VIDEO INPUT SIGNALS OF COMPOSITE AND NON-COMPOSITE FORM

This is a continuation of PCT application Ser. No. EP90/00942 filed on Jun. 15, 1990.

FIELD OF THE INVENTION

This invention relates to television apparatus generally and particularly to television apparatus with adaptive signal selection and processing for video input signals in which the chrominance and luminance components are either combined (e.g., composite video) or are of separated (e.g., S-VHS) form.

BACKGROUND OF THE INVENTION

A video signal source for providing a composite video signal (for example, a video recorder, a camera or a character generator) can be connected to the so-called "SCART" input connector or socket of a television receiver. The composite video signal (hereinafter "CSCC") of such a transmitter is conventionally applied to pin 20 of the SCART socket. On the other hand, there are also video signal sources which on the one hand provide a luminance (here in after, SCC) signal and on the other hand provide a modulated color subcarrier C at separate outputs. This signal transmission format is used with so-called "Super VHS" (S-VHS) and has the advantage that no cross-talk occurs between the luminance signal and the color subcarrier. Advantageously, in apparatus utilizing S-VHS input signals, the conventional color subcarrier trap in the path of the luminance signal is not required. With such a signal source, the luminance (Y or "SCC") signal is fed to the pin 20 of the "SCART socket of the apparatus without the color subcarrier and the modulated color subcarrier (C) is fed to the pin 15 of the SCART socket.

The two mentioned signal types (e.g., composite and S-VHS video) require different processing within the television device. Therefore, it is known to provide the device with a manual change-over switch with which a suitable change-over is possible, for example, between the composite video signal format and the separated video signal format (e.g., between VHS and S-VHS sources, for example). Thus, this change-over requires an additional manipulation or, stated another way, a change in the signal processing in the television apparatus. As well as that, there is a danger that with the presence of a S-VHS signal reproduction is performed in black and white follows although in reality a color television signal is present.

Also, a circuit is known (e.g., from EP-A2- 0 309 891) in which a changeover switch couples the input of the color decoder, in its neutral position, with pin 20 via a color sub-carrier filter and, in the second position, with pin 15. A switching voltage generated in the color decoder and indicating the presence of a color sub-carrier switches, when the color sub-carrier is present at pin 20, the changeover switch to its neutral position and, in the case there is no color sub-carrier at pin 20, to the second position. It is hereby attained that when the color sub-carrier is present at pin 20, i.e., a CSCC signal is present, only this signal is being evaluated and when no color sub-carrier is present at pin 20 the color channel is switched to pin 15. The latter is required in the known circuit because in that case the luminance signal Y at pin 20 and the color sub-carrier at pin 15 are provided separately.

SUMMARY OF THE INVENTION

It is herein recognized that if a CSCC signal without color sub-carrier is present at pin 20, for example, in the case of a black and white transmission, the known circuit would switch the color channel over to pin 15 and, therewith, switch on the operation mode for a signal with separate luminance (SCC) and chrominance (C) signals although such a signal is not present in reality. This is undesirable because in this case the mode for CSCC signal should be maintained in order to avoid interference.

It is an object of the invention to develop the circuit last described in such a way that in case of a CSCC signal without color sub-carrier the operation mode for CSCC signal automatically remains switched on.

In accordance with the invention a test process is performed through logical evaluation of uniquely recognizable criteria in the two different signals the result of which is the activation of the particular optimum working mode is performed automatically. The manual control of a switch is no longer necessary. Also, the device cannot operate in a non-optimum working mode for the particular signal and, in S-VHS for example, causes a black and white reproduction although a signal with colored picture contents exists. Stated another way, S-VHS input signals representing colored pictures will be processed correctly as color signals and not as monochrome (black and white) signals. Little design effort is required for the switch because the switching means used are conventional.

In principle, the invention is applicable with television devices which are offered the named different signals, in particular with television receivers, monitors, video recorders and other studio circuitry. The invention is applicable with all color television systems, such as PAL, NTSC AND SECAM and also for devices with a multi-standard chroma decoder.

The invention is described in the following by means of the example of a television receiver which can have, optionally, a composite video (CSCC) signal from a VHS video recorder or separate luminance (SCC) and (C) signals from an S-VHS video recorder fed in at the SCART socket.

BRIEF DESCRIPTION OF THE DRAWING

The invention is illustrated in the accompanying drawing wherein.

DETAILED DESCRIPTION

Figure 1:
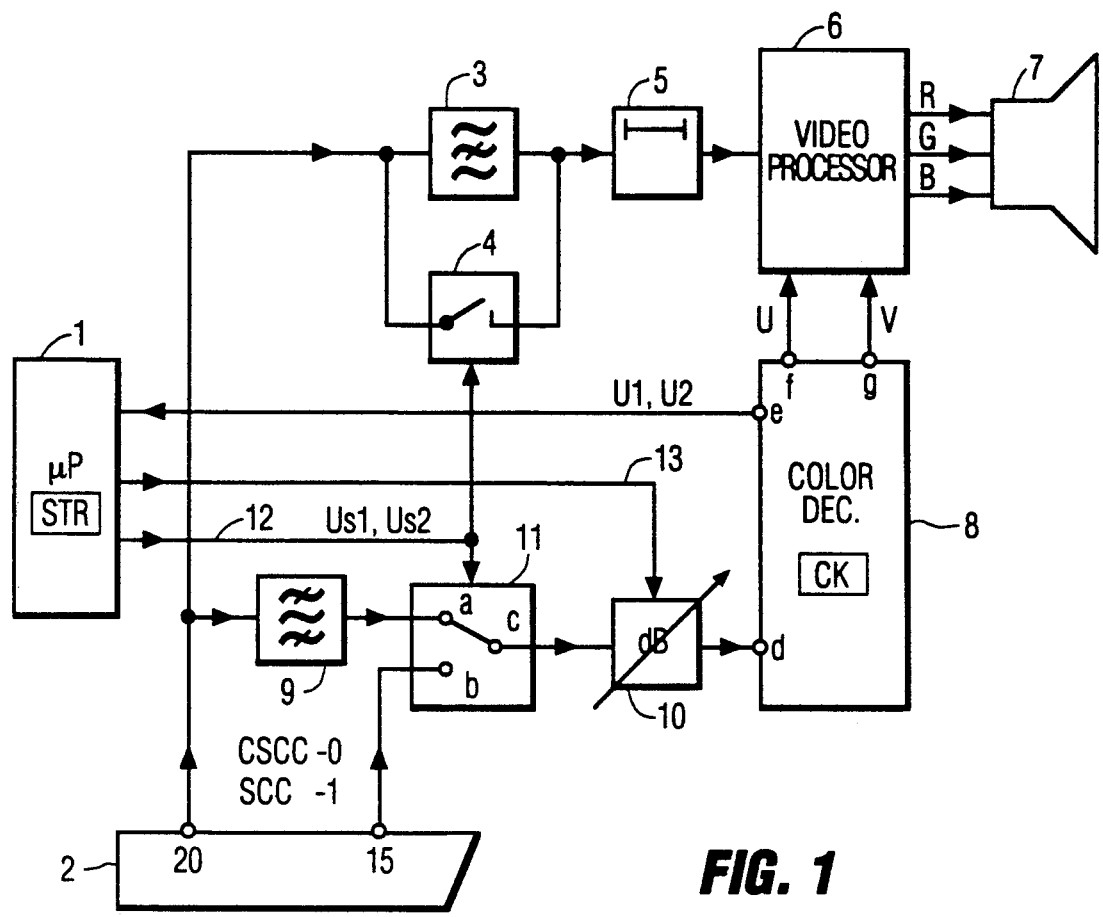
FIG. 1 is a block diagram of a television receiver developed according to the invention.

FIG. 1 shows in block diagram form, a television receiver comprising a microprocessor 1, a SCART socket 2, a color subcarrier trap 3, a color subcarrier trap by-pass switch 4, a recovery step 5 which serves the transit (delay) time compensation, the video processor 6, a kinescope 7, a color decoder 8, a band filter 9 which is tuned in with the frequency of the color subcarrier, a change-over switch 11 and a controllable absorptive attenuator 10.

Different color television signals from a video signal transmitter or other suitable source can be fed to the SCART socket 2. For example, a composite (CSCC)

video input signal may be applied to pin 20 of the SCART socket 2. With the connection of an S-VHS video recorder which feeds the luminance (SCC) signal on the one hand and the color subcarrier (C) or the color signals on the other hand in separate wires, the luminance (SCC) signal would be applied to pin 20 and the modulated color subcarrier C would be applied to pin 15. How the circuit shown in FIG. 1 can recognize these different signals at pin 20 or at pins 15 and 20 and carry out the corresponding change-overs is described in the following.

In the neutral position the switch 4 is open and the change-over switch 11 is in position "a" as shown. If a color subcarrier exists at pin 20 then it reaches input "d" of the color decoder 8 via the band filter 9, the change-over switch 11 and the absorptive attenuator 10. A voltage U1 or U2 is generated at an output "e" by a so called "color killer" (CK) circuit of the color decoder 8 (which is of conventional design). The "color killer" (CK) circuit automatically blocks color signal generation by the color channel. The voltages U1 and U2 produced at output "e" of the color decoder 8 through evaluation of the color sync bursts indicate the presence or absence of the color sync burst and also of the modulated color subcarrier.

If the presence of the color subcarrier is detected in the color decoder 8 the voltage U1 is generated at the output "e" and is applied to an input of the receiver control micro-processor 1. Because the presence of a color subcarrier at pin 20 is now established and this can only be caused by an applied CSCC signal, the two switches 4, 11 are held in the neutral position shown by the processor 1 with the switching voltage U1 via the switch control bus or wire 12. Thus the CSCC signal at pin 20 is processed in the normal way. Specifically, the luminance signal SCC is applied to the video processor 6 via the color subcarrier trap 3 and the compensating delay 5. The color subcarrier C, via the band filter 9, the switch 11 and the absorptive attenuator 10, is applied to the input "d" of the color decoder 8 which generates the color difference signals U and V at its outputs f and g. The processor 6 generates the three color signals R, G and B for the picture tube 7.

If with the shown positions of switches 4 and 11 in the color decoder 8 no color sync burst and therefore no color subcarrier is detected then an uncertainty exists at first. That is to say, it is possible that a black and white signal without color subcarrier is applied at pin 20 or that it is in fact an S-VHS signal with which the color subcarrier C exists separated from the luminance signal SCC at pin 15. Now, the voltage U2 is generated which indicates the absence of the color subcarrier. Through this, the turn-on voltage Us2 is generated in the processor 1 and this switches the change-over switch 11 to the position "b" via the line 12 so that now pin 15 is connected to the input "d" of the color decoder 8. The color decoder 8 now again determines whether or not a color subcarrier exists. If the presence of a color subcarrier is detected then it means that a color subcarrier C exists at pin 15. The processor now supplies the turn-on voltage Us2, which holds the change-over switch 11 in position "b", to evaluate the color subcarrier at pin 15. At the same time the switch 4 is closed by Us2 whereby the color subcarrier trap 3 is by-passed. This is logical because now a color subcarrier C no longer exists in the SCC signal at pin 20 and therefore, a suppression of the corresponding frequency range by the color subcarrier trap 3 would only be detrimental.

If, however, no color subcarrier in the color decoder 8 is detected at position "b" of the change-over switch 11 it means that no color sync burst and no color subcarrier exists at pin 15 and therefore, no S-VHS signal exists. It is assumed that the S-VHS signal always contains the color sync burst even with a black and white picture. Because at the beginning of the test phase, also, no color subcarrier was determined in the signal at pin 20, it must be a luminance only (SCC) signal at pin 20 without a color subcarrier C, i.e., a black and white (monochrome) signal. Therefore, the processor 1 again generates the turn-on voltage Us1 which switches back the change-over switch 11 to the neutral position a. The switch 4 can in this case be kept closed because the SCC signal at pin 20 is a black and white signal and does not contain a color subcarrier.

Consequently, the circuit always causes an automatic adaptation to the three conceivable possibilities, namely:
1. CSCC signal with color content at pin 20.
2. SCC signal at pin 20 and color subcarrier C at pin 15, for example, from an S-VHS recorder.
3. CSCC signal without color subcarrier at pin 20, that is, a pure black and white signal.

The absorptive attenuator 10 between the output "c" of the change-over switch 11 and the input "d" of the color decoder 8 serves the following purpose. Specifically, the signal at pin 20 may contain residual carriers in the frequency range of the color subcarrier which, consequently, reach the input "d" of the color decoder 8 and can lead to faulty triggerings. Therefore, during the test process described according to FIG. 2, it is practical to attenuate the signal which is fed to input "d" by approximately 10 dB. Therefore, the absorptive attenuator 10 is switched on with an attenuation of 10 dB by the processor 1 via the wire 13 during the test process "T" according to FIG. 2. During the stationary operation in one of the three operating modes described the absorptive attenuator 10 is switched off.

Figure 2:
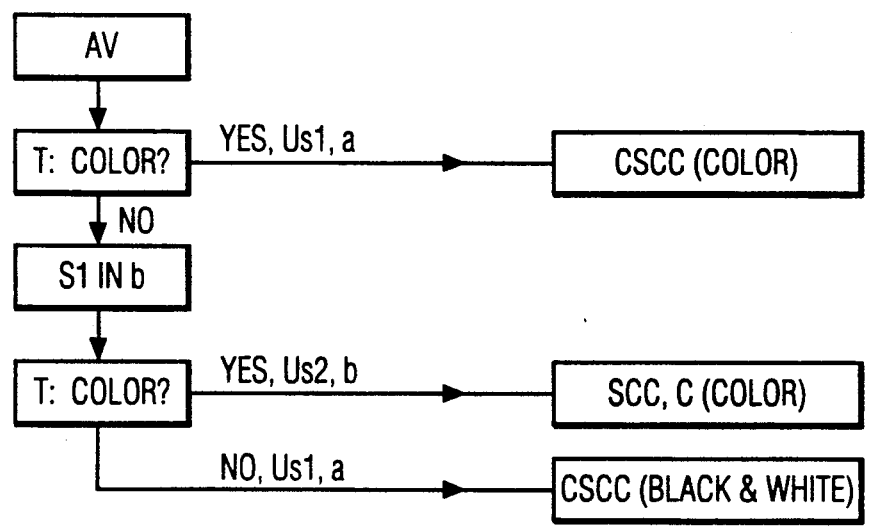
FIG. 2 is a diagram illustrating a signal test or evaluation process used in the television receiver of FIG. 1.

It is advantageous to store the status of the three possible conditions which have been determined in a storage memory (STR) the test process T according to FIG. 2 in the processor 1. That means that the status to be set is already known and need not be determined, for example, after having switched the receiver off and on again. A new test process is always performed when the AV ("audio/video") selection key is depressed again or pin 8 of the SCART socket 2 indicates a new reproduction process.

What is claimed is:
1. Television apparatus for alternately processing a composite video (CSCC) signal or separated luminance (SCC) and chrominance (C) signals, comprising:
   a first input terminal (20) for providing said composite video (CSCC) signal or said separated luminance (SCC) signal;
   a second input terminal (15) for providing said separated chrominance (C) signal;
   a color decoder (8) for decoding a color subcarrier if it is present in an input signal coupled to an input (d) of said color decoder (11) to produce at least one color representative signal (U or V) at an output (f or g, respectively) of said color decoder;
   a color sub-carrier filter (9);
   a change-over switch (11) having a first input (a) coupled to said first input terminal (20), a second input (b) coupled to said second input terminal, and an output (c) coupled to said input (d) of said color decoder (8); said change-over switch in a first position (a) coupling said input (d) of said color decoder (8) to said first input terminal (20) through a path including said color sub-carrier filter (9), and in a second position (b) coupling said input (d) of said color decoder (8) to said second input terminal (15) through a path not including said color sub-carrier filter (9);

detector means (CK) coupled to said output (c) of said change-over switch (11) for detecting the presence or absence of a color sub-carrier at said output (c) of said change-over switch (11); and control means (1) coupled to said detector means (CK) for controlling said change-over switch in response to the presence or absence of a color sub-carrier at said output (c) of said change-over switch (11); said control means initially causing said change-over switch (11) to be in said first position (a) and thereafter causing said change-over switch (11) to remain in said first position (a) if a color sub-carrier is present at said output (c) of said change-over switch (11), but causing said change-over switch (11) to be in said second position (b) if a color sub-carrier is not present at said output (c) of said change-over switch (11); and once said change-over switch (11) is in said second position (b), said control means (1) causing said change-over switch (11) to be switched back to said first position (a) from said second position (b) if a color sub-carrier is still not present at said output (c) of said change over switch (11).

2. Apparatus, as recited in claim 1 wherein:
said detecting means comprises a color killer unit (CK) included in said color decoder and coupled to said input of said color decoder.

3. Apparatus, as recited in claim 1 wherein:
said first input (20) is connected with a video processor (6) via a color subcarrier trap (3) for removing signal components in a predetermined frequency range including that of a color sub-carrier.

4. Apparatus, as recited in claim 3 wherein:
means (4) are coupled to said color sub-carrier trap and are controlled by said control means so that when said change-over switch (11) is in said second position (b) said color subcarrier trap (3) is disabled from removing said signal components in said predetermined frequency range.

5. Apparatus, as recited in claim 1 wherein:
a controllable attenuator (10) is coupled between said output (c) of said change-over switch (11) and said input (d) of said color decoder (8); said controllable attenuator (11) being controlled by said control means to have a first attenuation value when the presence or absence of a color subcarrier is being evaluated by said control means, and a second, lesser attenuation value otherwise.

6. Apparatus as recited in claim 1 wherein:
said control means comprises a micro-processor including storage means for storing the status of said change-over switch.

* * * * *